United States Patent [19]

Kim et al.

[11] Patent Number: 5,586,229
[45] Date of Patent: Dec. 17, 1996

[54] BAND PRINTING METHOD FOR PREVENTING BAND OVERRUN ERROR IN PAGE PRINTER

[75] Inventors: Kwang-Seuk Kim; Byung-Oh Park, both of Suwon, Rep. of Korea

[73] Assignee: SamSung Electronics Co., Ltd., Suwon, Rep. of Korea

[21] Appl. No.: 551,243

[22] Filed: Oct. 31, 1995

[30] Foreign Application Priority Data

Oct. 31, 1994 [KR] Rep. of Korea ................. 28228/1994

[51] Int. Cl.$^6$ ................................................. G06K 15/00
[52] U.S. Cl. ........................................... 395/116; 395/112
[58] Field of Search .................................. 395/112, 113, 395/114, 115, 116; 364/551.01; 358/444, 404, 261.4

[56] References Cited

U.S. PATENT DOCUMENTS

| | | | |
|---|---|---|---|
| 4,346,446 | 8/1982 | Erbstein et al. | 364/551.1 |
| 5,058,037 | 10/1991 | Kageyama et al. | |
| 5,084,831 | 1/1992 | Morikawa et al. | |
| 5,093,904 | 3/1992 | Sasaki et al. | |
| 5,129,049 | 7/1992 | Cuzzo et al. | 395/112 |
| 5,136,688 | 8/1992 | Morikawa et al. | |
| 5,146,545 | 9/1992 | Maruyama. | |
| 5,163,123 | 11/1992 | Kadono. | |
| 5,167,014 | 11/1992 | Shimomura. | |
| 5,191,430 | 3/1993 | Sudoh. | |
| 5,218,670 | 6/1993 | Sodek, Jr. | |
| 5,274,461 | 12/1993 | Mitsuhashi. | |
| 5,410,672 | 4/1995 | Sodek, Jr. et al. | |

*Primary Examiner*—Arthur G. Evans
*Attorney, Agent, or Firm*—Robert E. Bushnell, Esq.

[57] ABSTRACT

A novel band printing method of a page printer for preventing band overrun error during printing. The band printing method of a page printer includes the steps of receiving print data corresponding to one page from a host computer, transforming received print data of one page into a plurality of individual bands of print data, converting received print data of each band into a corresponding symbolic command, determining a conversion time for converting the symbolic command of each band into bit map data for band printing, sequentially comparing the conversion time of each band with a given standard time, pre-processing and storing the symbolic command of each corresponding band followed a first band that has the conversion time exceeding the given standard time in a pre-process area of a memory, converting the symbolic command of the first band into bit map data and printing the bit map data of the first band on a paper, determining whether the symbolic command of each band following the first band has been pre-processed, printing the pre-processed bit map data stored in the pre-process area of the memory on the paper when the symbolic command of the corresponding band following the first band has been pre-processed, and converting the symbolic command of the corresponding band into bit map data and printing the bit map data on the paper when the symbolic command of the corresponding band following the first band has not been pre-processed.

10 Claims, 3 Drawing Sheets

BAND PRINTING METHOD FOR PREVENTING BAND OVERRUN ERROR IN PAGE PRINTER

CROSS-REFERENCE TO RELATED APPLICATIONS

This application makes reference to, incorporates the same herein, and claims all benefits accruing under 35 U.S.C. §119 from an application for Band Printing Method For Preventing Band Overrun Error In Page Printer earlier filed in the Korean Industrial Property Office on 31 Oct. 1994 and assigned Ser. No. 28228/1994.

BACKGROUND OF THE INVENTION

Technical Field

The present invention relates to a printing method of a page printer, and particularly to a band printing method of preventing band overrun error during printing bit image data.

Background Art

Generally, conventional page printers such as laser printers as described, for example, in U.S. Pat. No. 5,167,014 for Printing Apparatus issued to Shimomura and U.S. Pat. No. 5,5274,461 for Image Processing Apparatus Which Predicts When To Prepare For Image Forming Operations issued to Mitsuhashi, receive image data such as character data, graphic data and various kinds of commands sent from a host computer, develop them into bit map data on a bit map memory, store the developed bit map data therein, and then send to a printer engine to print an image of bit map data on a printing paper. These page printers are printing image data with a resolution of 300 dots per inch in longitudinal and lateral directions. If a full page print image buffer is used to obtain this resolution, approximately one megabyte of memory is required for printing bit map data on a letter size paper of 8.5×11 inches, and over 1.25 megabyte for a legal size paper. Thus, a full page print image buffer approach requires implementation of a relatively costly memory hardware having a memory capacity of one page into the laser printer. This increases the cost of the laser printer, particularly to those having higher resolution. Moreover, this full page print image buffer approach is effective only for processing image data of a predetermined letter size. Accordingly, in order to reduce the memory capacity of the memory hardware required, many laser printers today are using a banded, or partial page, print image buffer approach in which image data of one page are divided in smaller plural bands that are imaged as the page is being printed, and two bit map memories, call as band buffers are alternately used to write and read the image data portions.

While the band printing method significantly reduces the memory hardware required, it also introduces processing complications. For example, the image data that are being transferred may exceed boundaries of the available band buffer. Banded buffer overflows may be contained without a heavy demand on a system processor as disclosed, for example, in U.S. Pat. No. 5,218,670 and No. 5,410,672 for Apparatus And Methods For The Handling Of Banded Frame Buffer Overflows both issued to Sodek, Jr. et al. However, the speed in which the data are sent to the printer engine for page printing is still limited by the speed at which the image data are developed onto the band memory. It takes a considerable time to analyze vector graphic data received from the host computer to the start of printing thereof. One solution in the art is disclosed, for example, in U.S. Pat. No. 5,084,831 for Printer And Printing Method issued to Morikawa et al., in which a laser printer is switching between a full page print image buffer mode and a banded, or partial page, print image buffer mode in accordance with different image size so as to minimize the memory capacity and to maximize the printing speed and quality.

Another technique is to develop the image data onto the band memory at a high speed so that access to the image data stored in respective band memories can be as continuous as possible, data received from the host computer may be converted, not into bit map data, but into intermediate data having a format easily convertible to bit map data, i.e., symbolic commands for storage in different memory area, and then converted into bit map data for printing. This technique is disclosed, for example, in U.S. Pat. No. 5,136,688 for Print Data Processing Apparatus For An Image Forming Apparatus issued to Morikawa et al. However, in such technique, we have observed that band overrun error has often occurred. This is because the printing time of the bit map data of the two band buffers is constant regardless of the band, but the time required to convert the symbolic command into the bit map data for printing is not constant at every band. Consequently, the conversion of the symbolic command of the next band may be delayed resulting in a band overrun error which disrupts the printing operation of the page printer.

SUMMARY OF THE INVENTION

Accordingly, it is therefore an object of the present invention to provide a band printing method for a page printer capable of preventing a band overrun error during printing operation.

It is also object of the present invention to provide a band printing method for a pager printer capable of efficiently developing print data into bit map data for printing, when the print data corresponding to one page is divided into a plurality of individual bands.

To achieve the above and other objects, the present invention contemplates upon a novel band printing method of a page printer including a memory, an engine unit, and a control unit. The method contemplates receiving image data corresponding to an image of one page from an external device to be printed on a paper, and dividing received image data into a plurality of individual bands; converting said received image data of each band into symbolic command of corresponding band, and storing the symbolic command of each band in the memory; determining a conversion time required for converting the symbolic command of each band into bit map data; sequentially comparing the conversion time of each band with a given standard time; pre-processing the symbolic command of each corresponding band followed a first band that has the conversion time exceeding the given standard time to produce pre-processed bit map data, and storing pre-processed bit map data of corresponding band that has the conversion time exceeding the given standard time in a pre-process area of the memory; converting the symbolic command of the first band into bit map data, and sending the bit map data of the first band to the engine unit for printing on the paper; determining whether the symbolic command of each band following the first band has been pre-processed; when the symbolic command of a corresponding band following the first band has been pre-processed, sending the corresponding pre-processed bit map data stored in the pre-process area to the engine unit for priming on the paper; and when the symbolic command of the corresponding band following the first band has not been pre-processed, convening the symbolic command of the corresponding band into bit map data and sending the bit map data to the engine unit for printing on the paper.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
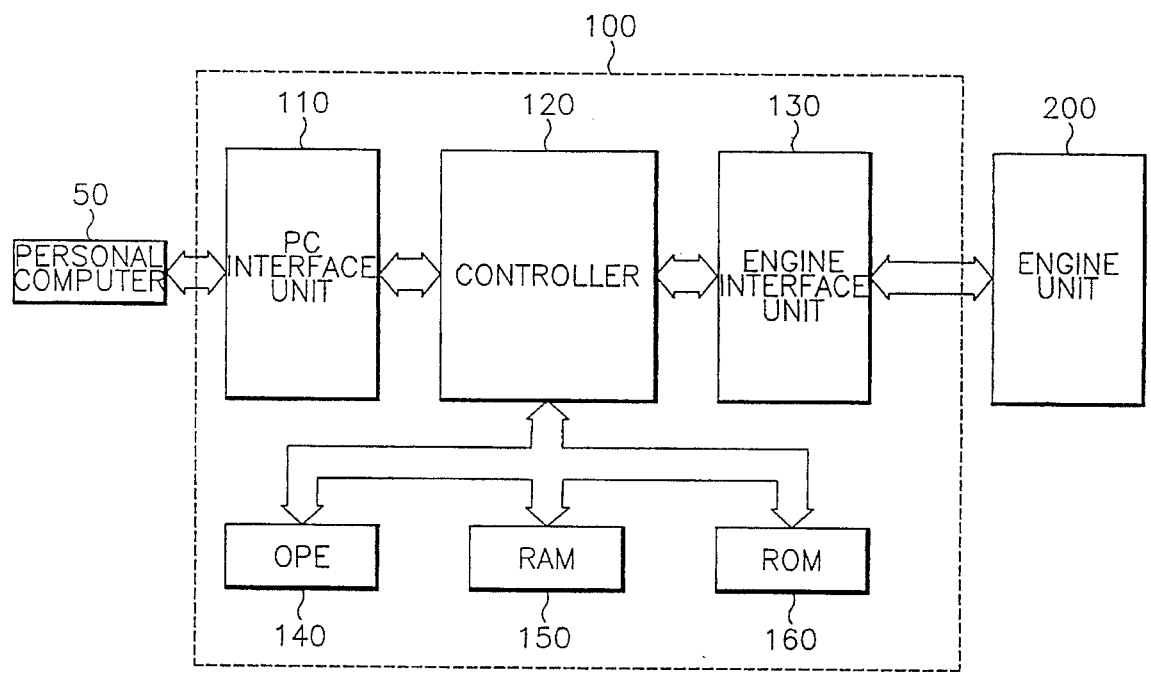
FIG. 1 illustrates a conventional page printer having an electrophotographic developing system.

Referring now to the drawings and particularly to FIG. 1, which illustrates the construction of a conventional general page printer using the electrophotographic developing system. The page printer typically comprises a video controller 100 and an engine unit 200.

As shown in FIG. 1, the video controller 100 includes a PC interface unit 110 which interfaces with a personal computer 50; a controller 120 which converts video data received from the host computer 50 via the PC interface unit 110 into bit map data to be printed and controls an overall printing operation; an engine interface unit 130 which interfaces with an engine unit 200 under the control of the controller 120; an operating panel equipment (OPE) 140 which comprises a plurality of keys capable of generating key data to the controller 120 and displays information in accordance with control operation of the controller 120; a random access memory (RAM) 150 which temporarily stores the video data received from the PC interface unit 110 and all kinds of temporary data for controlling printing operation under the control of the controller 120; and a read only memory (ROM) 160 which includes a control program and a data source for symbolic command conversion of the controller 120.

Figure 2:
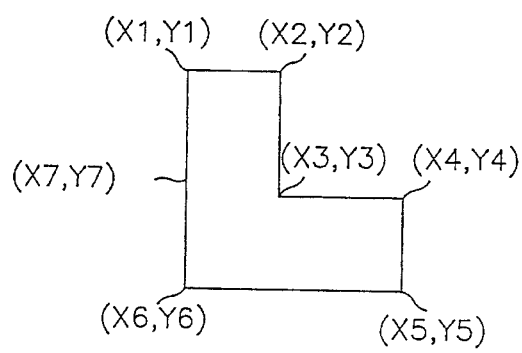
FIG. 2 illustrates X and Y coordinates representing symbolic command conversion of a character "L"

When the page printer as constructed in FIG. 1 is implemented with the convention band printing technique, the controller 120 first divides the video data corresponding to one page received from the host computer 50 via the PC interface unit 110 into a plurality of band blocks, converts the divided video data of a corresponding band block not into bit map data but into intermediate data having a format easy to be converted into bit map data, i.e., into a symbolic command, and stores the symbolic command of the corresponding band block in the RAM 150. The symbolic command converted from the video data received from the host computer 50 contain character data, font data and line data. For example, FIG. 2 illustrates symbolic data conversion of character "L" in X and Y coordinates. Herein, the character "L" belongs to the font data, and once the font data is converted into the symbolic command, two symbolic commands exist as below:

RET {(X1, Y1), (X2, Y2), (X3, Y3), (X7, Y7)}

RET {(X7, Y7), (X4, Y4), (X5, Y5), (X6, Y6)}

Figure 3:
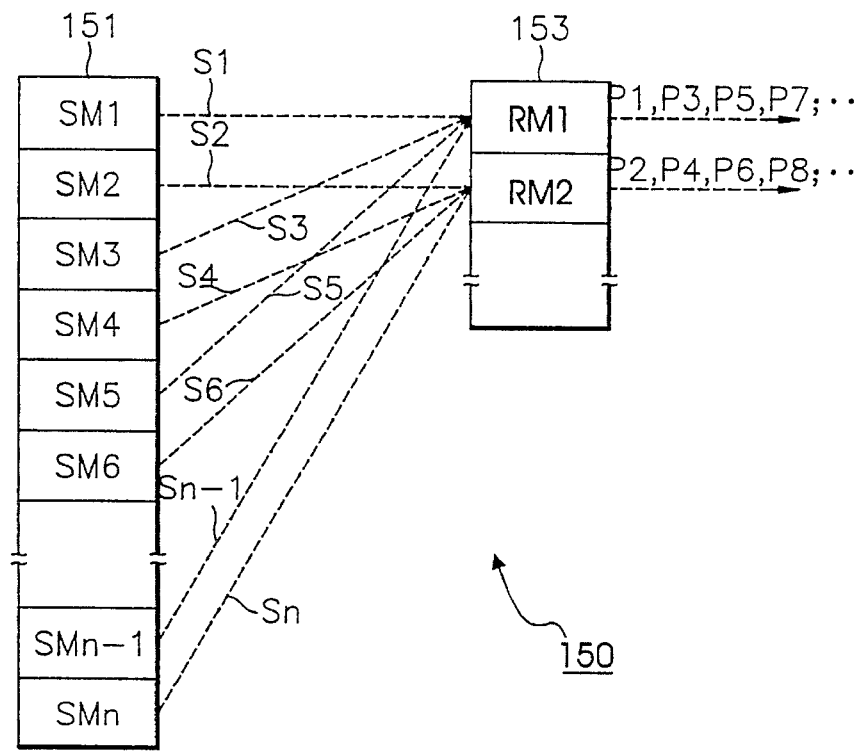
FIG. 3 is a memory map showing a memory state of a conventional band printing method for a page printer.

The symbolic commands converted as described above are sequentially stored by the band in the RAM 150. FIG. 3 illustrates a memory map of the RAM 150 accommodating the conventional band printing technique, in which the RAM 150 is conveniently divided into a first memory area 151 for storing the symbolic commands of each corresponding band block and a second memory area 153 for storing bit map data for enabling printing. Further, each of reference symbols SM1 to SMn of the first memory area 151 represents a memory block of storing the symbolic command of one band, and each of reference symbols RM1 and RM2 of the second memory area 153 represents a memory block of storing the bit map data of one band.

When the video data received from the host computer 50 corresponding to one page are all converted into symbolic commands of corresponding band blocks, the controller 120 first converts the symbolic command of a first band stored in the memory block SM1 of the first memory area 151 from the RAM 150 into bit map data of the first band during a time period $T_{RB1}$ and stores the converted bit map data of the first band in the memory block RM1 of the second memory area 153. The controller 120 then sends the bit map data stored in the memory block RM1 to the engine unit 200 through the engine interface unit 130 and drives the engine unit 200 to print the bit map data of the first band. While printing the bit map data of the first band by the engine unit 200, the controller 120 reads the symbolic command of a second band in the memory block SM2 of the first memory area 151, converts the read symbolic command into the bit map data of the second band for a time period $T_{RB2}$, and stores the converted bit map data in the memory block RM2 of the second memory area 153. Thus, when the printing of the bit map data of the first band is completed, the controller 120 outputs the bit map data of the second band stored in the memory block RM2 to the engine unit 200 through the engine interface unit 130, reads the symbolic command of a third band in the memory block SM3 of the first memory area 151, converts the read symbolic command of the third band into the bit map data of the third band for a time period $T_{RB3}$, and stores the converted bit map data in the memory block RM1 of the second memory area 153. Thereafter, the printing and the conversion of the bit map data to the symbolic command of each subsequent band in the memory block of the first memory area 151 alternate until the symbolic command of a final band in the memory block SMn is convened for completion of printing operation of one page. Typically, the symbolic commands in the memory blocks SM1 to SMn of the first memory area 151 are sequentially convened into the bit map data in order of S1, S2, S3 ... Sn–1, and Sn, and then reciprocally stored in the memory blocks RM1 and RM2, and the printing processes of the bit map data by the band are executed in order of P1, P2, P3, P4, P5, P6, P7, P8 ... as shown in FIG. 3.

Therefore, when the conventional band printing technique is used in the page printer, normal printing operation of each page can be performed, if the RAM 150 is provided with a memory area capable of storing bit map data of two bands and a memory area capable of storing symbolic commands of one page. The conventional band printing technique however results in occasional band overrun errors. This is because the actual printing time of the bit map data of each band is constant regardless of the band, but the conversion time required to convert the symbolic command into the bit map data for printing is not constant at every band. Consequently, the conversion line of the symbolic command of the next band often exceeds actual printing time of the bit map data of the previous band resulting in a band overrun error which disrupts the printing operation of the page printer.

Figure 4:
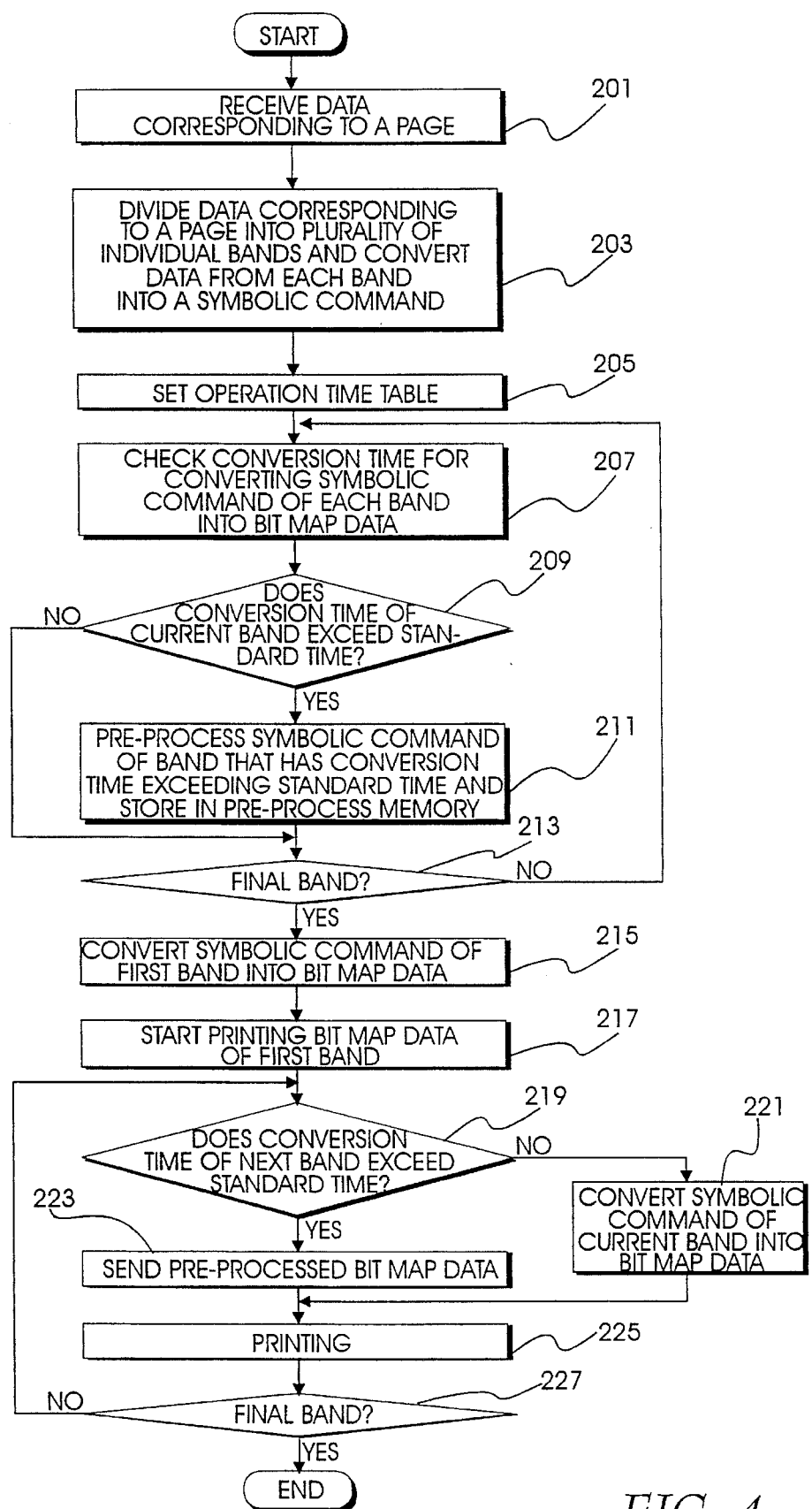
FIG. 4 illustrates a flow chart of a novel band printing method for a page printer according to a preferred embodiment of the present invention.

Turning now to FIG. 4 which illustrates a band printing control method of a page printer according to a preferred embodiment of the present invention. The band printing control method of FIG. 4 is designed to prevent the band overrun error which has often occurred during the printing of a paper. An explanation on a preferred embodiment of the present invention will be given with reference to FIGS. 1 to 4 as follows.

First, the controller 120 receives video data corresponding to one page from the host computer 50 through the PC interface unit 110 in step 201. In step 203, the controller 120 divides the video data corresponding to one page received from the host computer 50 into a plurality of individual bands and converts the divided video data of each band into a symbolic command.

In step 205, the controller 120 sets an operation time table contained in the ROM 160 for estimating a conversion time required for converting the symbolic command of each band into the bit map data. The operation time table is set by the controller 120 based upon the video data received from the host computer 50. As described earlier, the video data corresponding to one page received from the host computer 50 contain bit map data, font data and line data and all are divided into a plurality of individual bands before being converted into a symbolic command of the corresponding band. The controller 120 estimates the conversion time required for converting the symbolic command of each band into bit map data so as to send the bit map data to the engine unit 200 for printing, by using the number of byte in the symbolic command of the bit map data, the size of a corresponding font in the symbolic command of the font data, and the length of a print line in the symbolic command of the line data. The conversion time may be varied in accordance with the printing language, the performance capacity of the controller 120. After obtaining the conversion times of each symbolic command corresponding to each band, the controller 120 can estimate the time required to convert the symbolic command of each band into bit map data for printing. For example, the estimated conversion time for the band in the memory block SM1 corresponds to 0.9 second. The estimated conversion time for the band in the memory block SM2 corresponds to 0.8 second, and for the band in the memory block SM3 corresponds to 1.5 seconds. In setting the operation time table, the controller 120 may ignore the conversion time required for converting the symbolic command of the first band because the band overrun error does not occur and may be ignored during the bit map processing of the first band.

After the operation time table is set at step 205, the controller 120 sequentially checks the conversion time for converting the symbolic command of each band into bit map data of the corresponding band in step 207 in the operation time table, and determining whether a conversion time of a current band exceeds a given standard time in step 209. The given standard time refers to a limit value which does not generate a band overran error and can be varied according to different types of primers; it is a constant time required for printing the video data corresponding to one band by the engine unit 200 of the page printer. For example, if the page printer is capable of dividing the video data of one page received from the host computer 50 into ten individual bands, and then printing the video data of one page in ten seconds, one second is then required for printing data of one band. Hence, one second corresponds to the given standard time used according to the present invention.

When the controller 120 determines that the conversion time required for converting the symbolic command of the current band exceeds the given standard time at step 209, the controller 120 converts the symbolic command of the corresponding band into the bit map data and assigns the converted bit map data in a pro-process memory area of the RAM 150. That is, the controller 120 pre-processes the symbolic command of any band that has a conversion time exceeding the standard time into pre-processed bit map data for later printing in order to prevent band overrun error.

If, on the other hand, the controller 120 determines that the conversion time required for converting the symbolic command of the currently checked band does not exceed the given standard time at step 209, the controller 120 checks whether the symbolic command of the currently checked band is the symbolic command of a final band in step 213. When the controller 120 determines that the symbolic command of the current band is not the symbolic band of the final band at step 213, the controller 120 returns to step 207 to check the conversion time for converting the symbolic command of the next band into bit map data.

If, on the other hand, the controller 120 determines that the symbolic command of the currently checked band is the symbolic command of the final band at step 213, the controller 120 converts the symbolic command of the first band into the bit map data at step 215, sends the converted bit map data to the engine unit 200 through the engine interface unit 130 and concomitantly drives the engine unit 200 for printing the bit map data of the first band.

In the meantime, as an another embodiment of the present invention, since much time is not required to check the conversion time by each band unit, it is preferable to perform the checking process after converting the symbolic command of the first band into the bit map data.

Accordingly, the controller 120 reads the conversion time required to convert the symbolic command of the next band into the bit map data from the operation time table, and determines whether such conversion time exceeds the standard time at step 219. If the controller 120 determines that the conversion time required for converting the symbolic command of the current band into the bit map data exceeds the standard time at step 219, the controller 120 read the pre-processed bit map data previously stored in the pre-process memory of the RAM 150, and sends the read pre-processed bit map data to the engine unit 200 through the engine interface unit 130 for printing in step 225.

If, on the other hand, the controller 120 determines that the conversion time required for converting the symbolic command of the current band into the bit map data does not exceed the standard time at step 219, the controller 120 proceeds to convert the symbolic command of the current band into bit map data, and then sends the converted bit map data to the engine unit 200 through the engine interface unit 130 for printing at step 225.

After the bit map data of the current band is printed at step 225, the controller 120 determines whether the bit map data of the band printed at step 225 are the bit map data of a final band. If the controller 120 determines that the bit map data of the band printed at step 225 are the bit map data of the final band, the controller 120 completes the printing operation of one page and prepares for the next page. If, on the other hand, the controller 120 determines that the bit map data of the band printed at step 225 are not the bit map data of the final band, then the controller 120 returns to step 219 to determine whether the conversion time required for converting the symbolic command of the next band into the bit map data exceeds the standard time.

In addition, when the controller 120 determines that the conversion time required for converting the symbolic command of the current band exceeds the standard time at step 219, the controller 120 reads the pre-processed bit map data of the pre-processed band stored in the pre-processed memory of the RAM 150 in the step 211 and sends the read bit map data to the engine unit 200 through the engine interface unit 130 for printing at step 225.

Figure 5:
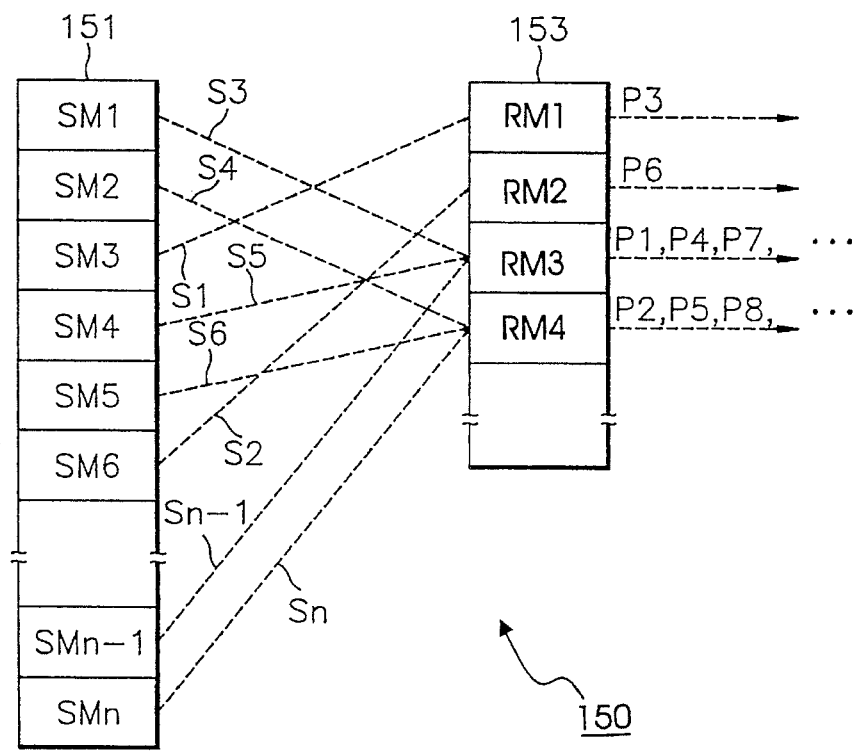
FIG. 5 is a memory map showing a memory state of the band printing method according to the present invention.

FIG. 5 is a memory map diagram showing the memory state of the band printing method according to the present invention. An embodiment of the present invention will be explained with reference to FIG. 5 as follows. Most significantly, as the result of checking the operation time table for the conversion time required to convert the symbolic data of each band into bit map data at steps 205, 207, 209, 211, 213, the controller 120 determines that the conversion time required for converting, for example, the symbolic command of a third band in a memory block SM3 and the symbolic command of a sixth band in a memory block SM6 among the symbolic commands in memory blocks SM1 to SMn stored in the first memory area 151 of the RAM 150 as shown in FIG. 5 exceeds the standard time. Then, the symbolic command of the third band in the memory block SM3 and the symbolic command of the sixth band in the memory block SM6 must first be pre-processed at step 211 and sequentially stored in the memory blocks RM1 and RM2 of the second memory area 153 of the RAM 150 as shown in FIG. 5.

Next, the controller 120 converts the symbolic command SM1 of the first band into the bit map data for a period of time $T_{RB1}$ and stores the converted bit map data in the memory block RM3. Thus, the controller 120 drives the engine unit 200 and outputs the bit map data stored in the memory block RM3 to the engine unit 200 through the engine interface unit 130 for printing. Thereafter, while printing the bit map data of the first band by the engine unit 200, the controller 120 reads an operation expecting time of the memory block SM2 in the operation time table and determines that the operation expecting time does not exceed the standard time in step 219 of FIG. 4, proceeds to step 211. At step 211, the controller 120 reads the symbolic command of the second band in the memory block SM2 from the RAM 150, converts the read symbolic command into the bit map data for a period of time $T_{RB2}$, and stores the converted bit map data in a memory block RM4. Also, when the printing of the bit map data of the first band is completed, the controller 120 outputs the bit map data of the second band stored in the memory block RM4 to the engine unit 200 through the engine interface unit 130 for printing. With respect to the symbolic command of the third band in the memory block SM3, the controller 120 reads an operation expecting time of the memory block SM3 in the operation time table, determines that the operation expecting time does not exceed the standard time in step 219 and proceeds to step 223. At step 223, the controller 120 outputs the bit map data pre-processed and stored in the memory block RM1 to the engine unit 200 through the engine interface unit 130. The controller 120 then proceeds to step 219 to read an operating expecting time of the memory block SM4 in the operation time table and determines that the operation expecting time does not exceed the standard time therein, before proceeding to step 221 to read the symbolic command of a fourth band in the memory block SM4, convert the read symbolic command into the bit map data for the period of time $T_{RB4}$, and store the converted bit map data in the memory block RM3.

Thus, while the controller 120 outputs the bit map data of the fourth band stored in the memory block RM3 to the engine unit 200 through the engine interface unit 130 for printing, it reads the symbolic command of a fifth band in a memory block SM5 from the RAM 150, converts the read symbolic command into the bit map data for a period of time $T_{RB5}$, and stores the converted bit map data in the memory block RM4. With respect to the symbolic command of a sixth band in a memory block SM6, while the controller 120 outputs the bit map data pre-processed and stored in the memory block RM2 to the engine unit 200 through the engine interface unit 130 for printing, it reads the symbolic command of a seventh command in a memory block SM7, converts the read symbolic command into the bit map data for a period of time $T_{RB7}$, and stores the converted bit map data in the memory block RM3.

Thereafter, once the printing and the conversion of the bit map data from the symbolic command of the seventh band in the memory block SM7 to the symbolic command of the final band in the memory block SMn are completed after repeating the operations described above, the printing operation of one page is completed. In this instance, the symbolic commands in the memory blocks SM1 to Smn are sequentially converted into the bit map data in order of S1, S2, S3 . . . Sn–1, Sn as shown in FIG. 5 and other symbolic commands, except for the symbolic command of the third band in the memory block SM3 and the symbolic command of the sixth band in the memory block SM6 are reciprocally stored in the memory blocks RM3 and RM4, thereby performing the printing processes of the bit map data by the band in order of P1, P2, P3, P4, P5, P6, P7, P8 . . .

If the novel band printing method of a page printer constructed according to the principles of the present invention may be summarized, the summary focuses upon the setting of an operation time table containing the conversion time required for converting the symbolic command of each band after the controller 120 stores the received data corresponding to one page as successive symbolic command of a plurality of individual bands and determines the conversion time required for converting the symbolic command of each band into bit map data for printing. Hence, before the printing operation via the actual bit map data converting processes, the conversion time of all individual band is checked and any band having difficulty converting into bit map data within the given standard time is pre-processed and stored in a pre-process memory so that the conversion of the bit map data and storing the converted bit map data can be completed separately. Accordingly, when the printing operation and conversion operation are performed in accordance with the band order of one page, the separately stored band reads the pre-processed bit map data, thereby performing the printing operation. Here, the order that the symbolic command is converted into the bit map data is not sequentially performed unlike the order of the convention band printing method. As the result, the converting order of the bit map data is not same as the printing order thereof.

As apparent from the forgoing, the present invention has an advantage in that the generation of the band overrun error may be prevented regardless of the data state in the band during the band printing operation of the page printer because any band that has any possibility of generating the band overran error has already been pre-processed into the bit map data. In addition, the present invention also contemplates upon a band printing method of a page printer that utilizes a simple memory structure for preventing the band overran error.

Meanwhile, other modifications and variations to the present invention will be apparent to those skilled in the art from the foregoing disclosure and teachings. Thus, while only certain embodiments of the invention have been specifically described herein, it will be apparent that numerous modification may be made thereto without departing form the spirit and scope of the invention. For example, there is a number of methods adopted as the counting method except for the conversion time counting method used in the preferred embodiment of the present invention.

1. Assuming that the controller 120 obtains the number of dots included in the symbolic command of the corresponding band and the obtained number of the dots is set as a operation time value by comparing the obtained number of the dots with a given limit value of the number of the dots, the controller 120 checks whether the corresponding band of the symbolic command is a band that generates a band overran error and also obtains a processing overtime of the band in which the band overrun error is generated.

2. Assuming that the symbolic command can be represented by various types of commands and the same symbolic commands have the same processing time with each other, the controller 120 designates each kinds of the symbolic command processing value by comparing a sum of processing time values of all the commands in the band with a given standard value, checks whether the band of the symbolic command is the band that generates a band overrun error, and obtains the processing overtime of the band in which the band overrun error is generated.

3. Assuming that all kinds of the symbolic commands have the same processing times, the controller 120 obtains the sum of the symbolic command in the corresponding band by comparing the sum thereof with a given standard value, the controller 120 then checks whether the corresponding band of the symbolic command is the band that generates the band overrun error, and obtains the processing overtime of the band in which the band overrun error is generated.

Also, while in the embodiment of the present invention it has been explained the method of first-converting the received data corresponding to one page received from the external device into the symbolic command and second-converting the converted data into the bit map data, but a method of first converting the received data corresponding to one page into an another format that is easily convertible to the bit map data instead of the symbolic command as disclosed in the present invention.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A band printing method for a page printer, comprising:

receiving image data corresponding to an image of one page from an external device to be printed on a printable medium, and dividing received image data into a plurality of individual bands;

converting said received image data of each band into intermediate data, and storing said intermediate data of each band in a memory;

determining a conversion time required for converting said intermediate data of each band into bit map data;

sequentially comparing said conversion time of each band with a given standard time;

pre-processing said intermediate data of each corresponding band followed a first band that has said conversion time exceeding said given standard time to produce pre-processed bit map data, and storing said pre-processed bit map data of corresponding band that has said conversion time exceeding said given standard time in a pre-process area of said memory;

converting said intermediate data of said first band into said bit map data, and sending said bit map data of said first band to a print engine for printing on said printable medium;

determining whether said intermediate data of each band following said first band has been pre-processed;

when said intermediate data of a corresponding band following said first band has been pre-processed, sending the corresponding pre-processed bit map data stored in said pre-process area of said memory to said print engine for printing on said printable medium; and when said intermediate data of the corresponding band following said first band has not been pre-processed, convening said intermediate data of said corresponding band into said bit map data and sending said bit map data to said print engine for printing on said printable medium.

2. The band printing method as claimed in claim 1, wherein said received image data further contain font data and line data, and said conversion time is determined based upon the number of byte represented by said bit map data, the size of a corresponding font represented by said font data and the length of a print line represented by said line data.

3. The band printing method as claimed in claim 1, wherein said conversion time is determined based upon the number of dots contained in said intermediate data of the corresponding band.

4. The band printing method as claimed in claim 1, wherein said conversion time is determined based upon the number of said first converting data in each of said band and setting said calculating value as said converting time by said control means.

5. The band printing method as claimed in claim 1, wherein said conversion time is determined based upon a processing time of given first converting data, adding said processing time by the first convening data from said first convening data in each of said band, and setting an adding time as said converting time by said control means.

6. A printer, comprising:

means for receiving print data corresponding to one page from an external device, and transforming received print data of one page into a plurality of individual bands of print data to be printed on a printable medium;

a print engine for priming successive bands of said print data on said printable medium; and a controller for controlling successive band printing to prevent band overrun error during printing of said received print data of one page on said printable medium, said controller preventing said band overrun error by:

converting said received print data of each band into a corresponding symbolic command;

determining a conversion time for converting said symbolic command of each band into bit map data for band printing;

sequentially comparing said conversion time of each band with a given standard time;

pre-processing the symbolic command of each corresponding band followed a first band that has said conversion time exceeding said given standard time to provide pre-processed bit map data, and storing said pre-processed bit map data of each corresponding band that has said conversion time exceeding said given standard time in a pre-process area of said memory;

converting the symbolic command of said first band into bit map data, and sending said bit map data of said first band to a print engine for printing on said printable medium;

determining whether the symbolic command of each band following said first band has been pre-processed;

when the symbolic command of the corresponding band following said first band has been pre-processed, sending the pre-processed bit map data stored in said pre-process area of said memory to said print engine for printing on said printable medium; and when the symbolic command of the corresponding band following said first band has not been pre-processed, converting the symbolic command of said corresponding band into bit map data and sending said bit map data to said print engine for printing on said printable medium.

7. The printer as claimed in claim 6, wherein said received image data further contain font data and line data, and said conversion time is determined based upon the number of byte represented by said bit map data, the size of a corresponding font represented by said font data and the length of a print line represented by said line data.

8. The printer as claimed in claim 6, wherein said conversion time is determined based upon the number of dots contained in said intermediate data of the corresponding band.

9. The printer as claimed in claim 6, wherein said conversion time is determined based upon the number of said first converting data in each of said band and setting said calculating value as said converting time by said control means.

10. The printer as claimed in claim 6 wherein said controller ignores determining the conversion time required for converting the symbolic command of the first band.

* * * * *